United States Patent [19]
Fasanella et al.

[11] Patent Number: 5,818,997
[45] Date of Patent: Oct. 6, 1998

[54] MODULAR BUILDING BLOCK FOR AN OPTICAL INTERCONNECTION NETWORK

[75] Inventors: Kenneth W. Fasanella, Hamilton; Tae J. Kim; David T. Neilson, both of Plainsboro; Eugen Schenfeld, South Brunswick, all of N.J.

[73] Assignee: NEC Research Institute, Inc., Princeton, N.J.

[21] Appl. No.: 812,625

[22] Filed: Mar. 7, 1997

[51] Int. Cl.$^6$ ...................................................... G02B 6/00
[52] U.S. Cl. .......................... 385/147; 385/135; 385/137; 52/426
[58] Field of Search .......................... 385/147, 134–139; 52/426, 427, 428, 476

[56] References Cited

U.S. PATENT DOCUMENTS

| | | | |
|---|---|---|---|
| 4,884,382 | 12/1989 | Horobin | 52/426 |
| 4,984,403 | 1/1991 | Zarwell | 52/476 |
| 5,640,481 | 6/1997 | Llewellyn et al. | 385/134 |
| 5,659,652 | 8/1997 | D'Entremont | 385/147 |

OTHER PUBLICATIONS

V. Gupta and E. Schenfeld, "A Heuristic Approach for Embedding Communication Patterns in an Interconnection Cached Parallel Processing Network", Proc. IPPS, Apr. 1993, pp. 291–297.

Frederick B. McCormick, et al., "Five–stage free–space optical switching network with field–effect transistor self–electro–optic–effect–device smart–pixel arrays", Applied Optics, Mar. 10, 1994, vol. 33, No. 8, pp. 1601–1618.

*Primary Examiner*—Phan T. H. Palmer

[57] ABSTRACT

A modular building block for supporting arrays of microlenses, microlasers and microphotodetectors, etc. in an optical beam relay system used as an optical interconnection network. The building block includes a frame member on which is mounted the array. The frame member includes a base portion that is press fitted to the smooth top surface of a plate member. The bottom surface of the plate member includes a rail portion that is secured into a groove in the support structure, such as a table, that also supports various elements of the optical interconnection network.

7 Claims, 5 Drawing Sheets

MODULAR BUILDING BLOCK FOR AN OPTICAL INTERCONNECTION NETWORK

FIELD OF THE INVENTION

The present invention relates to optomechanical components and more particularly to such components for use in free-space optical interconnections.

BACKGROUND OF THE INVENTION

Free space optical interconnections can provide compact parallel access for many communication patterns with large bandwidth.

They are presently of particular interest for use in providing the interconnection network in systems for massively parallel processing that use optics in place of wires for interconnecting the many hundreds of subsystems, such as processors and memories, that are involved in the parallel computations that are continuously occurring. Additionally, such networks should be useful also generally in switching systems.

Of particular interest in such systems are reconfigurable interconnection networks whose topology can be altered between different phases of computation to accommodate algorithms or different phases of the same algorithm that involve different communication patterns between the processing elements involved.

The usefulness of such optical interconnection networks depend importantly on the availability of modular optical network building blocks. A modular building block capable of smaller misalignment than the alignment tolerance of the optics should make possible an optical interconnections network almost free of alignment problems.

Moreover, of particular interest for use in interconnection networks have been arrangements that use communication patterns that involve two dimensional rectangular arrays of light beams. Such arrangements are particularly sensitive to misalignment of the optical components used to form and maintain the light beams. Accordingly, there is particular interest in modular building blocks useful in optical interconnection networks involving two dimensional rectangular arrays of light beams.

SUMMARY OF THE INVENTION

The invention is a modular building block that can include any of a variety of optical elements for use in the assembly of an optical interconnection network. The optical elements that can be included in the block comprise, for example, microlens arrays, microlaser arrays for use in transmitting optical signals, or microphotodiode or fiber arrays for use in receiving optical signals in which the components are generally arranged in two dimensional rectangular arrays.

The invention is of particular interest in optical interconnection networks for use in an Interconnection Cached Network (ICN), which is a reconfigurable network that can efficiently embed many communication patterns and is described in a paper entitled "A Heuristic Approach for Embedding Communication Patterns in an Interconnection Cached Parallel Processing Network" by V. Gupta and E. Schenfeld, Proc. IPPS, April 1993, pps. 291–297.

A modular building block in accordance with the invention basically comprises a holder for supporting an optical component in a vertical position that includes a frame supporting a support member to which the optical component is affixed, a table that supports the holder in a vertical position, and a rack that supports the table and includes at its bottom surface at least one groove in which extends a tab from the table. In one embodiment the rack is a split rail structure and the tab is supported in the groove between the split rails. In an alternative embodiment, the rack includes a single rail and the rail fits in the opening between a pair of tabs extending from the bottom surface of the table. In each embodiment, a set screw typically serves to secure reference surfaces at the bottom of the table to surfaces of the rail. The set screw should be uniformly tightened to a prescribed torque to achieve precise alignment.

BRIEF DESCRIPTION OF THE DRAWINGS

The invention will be better understood from the following more detailed description taken in conjunction with the accompanying drawing in which.

DETAILED DESCRIPTION

Figure 1:
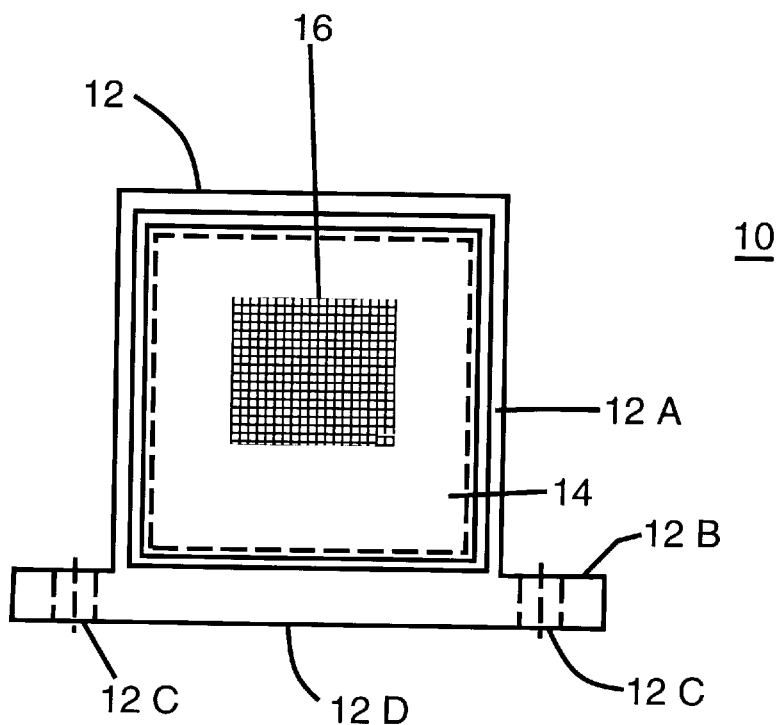
FIG. 1 is a front section of the holder supporting a microlens array that forms one element of a modular block assembly in accordance with the invention.

With reference now to FIG. 1, a holder 10 includes a frame 12 and a support member 14 enclosed within the frame 12. An optical element 16 that is a component of an optical beam relay, is supported by the support member 14.

The frame 12 is preferably of a thermally stable material, such as metal or plastic, that can readily be made to fairly exact tolerances and includes a rectangular frame portion 12A extending vertically from and integral with an extended horizontal base portion 12B.

The support member 14 is preferably a sheet of a material, such as glass, that is relatively transparent at the wavelengths of the optical signals being used by the network in which the invention is included. It is supported firmly within the rectangular frame portion 12A to be free of movement independent of the frame.

The particular optical element 16 being supported typically is bonded to near the center of the support member 14 precisely, in accordance with alignment marks, by optical cement or other adhesive, typically under a microscope to alignment tolerances of ±1 micron. The optical element or component 16 preferably is rectangular with dimensions typically of 8 by 8 millimeters. The support member 14 is preferably rectangular with dimensions typically of 14 by 14 millimeters and the frame 12 is preferably dimensioned about 18 by 18 millimeters.

The optical element generally will be a two-dimensional rectangular array either of microlenses, microlasers, fiber arrays, or microphotodiodes.

Figure 2:
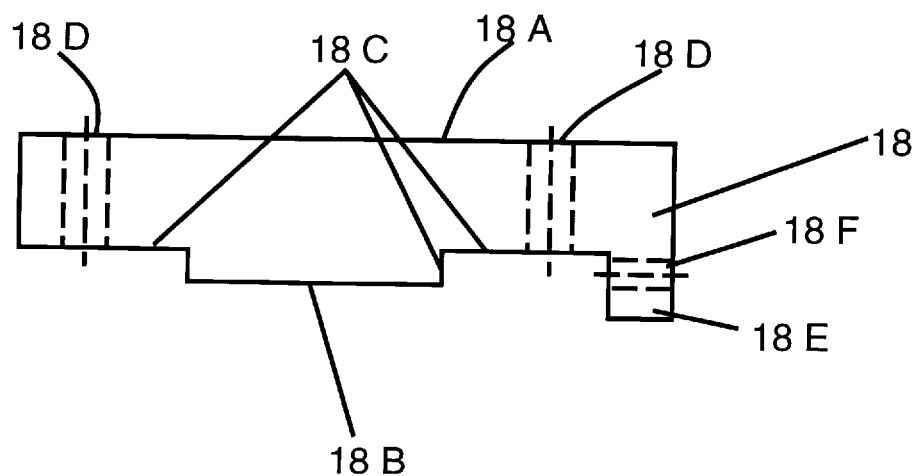
FIG. 2 is a front section of one form of table for support of the holder of FIG. 1 in a block assembly in accordance with the invention.

The base portion 12B of the frame member 12, which has a smooth bottom surface, is provided with a pair of holes 12C through which can be passed press fit pins (not shown) for fastening the frame 12 to be firmly supported vertically on table 18, shown in FIG. 2, preferably within the accuracy of ±10 microns.

Figure 3:
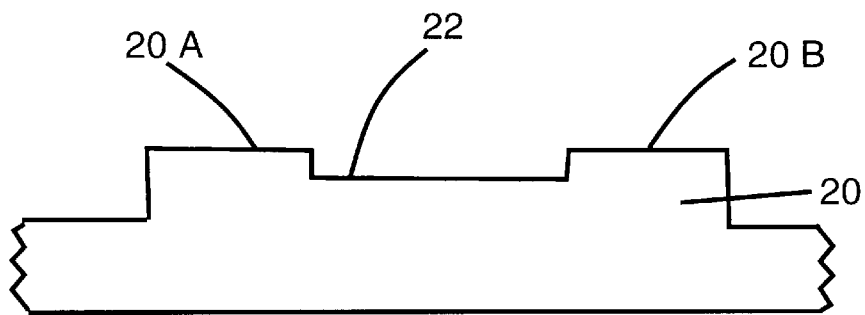
FIG. 3 is a front section of a split rail rack structure for support of the table shown in FIG. 2 of the block assembly in accordance with the invention.

The table member 18, which typically is of the same material as that of the frame 12 to avoid strains due to thermal effects, includes a flat and smooth top surface 18A matching the smooth bottom surface of the base portion 12D of the frame 12 and a bottom surface that includes a tab portion 18B whose dimensions are such as to fit in the groove 22 between the rails 20A, 20B of the rack 20, shown in FIG. 3, on which the optical interconnection network is mounted. The table 18 includes a pair of back surface portions 18C that are accurately machined to serve as reference surfaces. The table 18 includes a pair of holes 18D that will align with holes 12C so that frame member 12 can be fastened, in a press fit to the table 18 by press-fit pins (not shown) between holes 12C and 18D again preferably within the accuracy of ±10 microns. The table 18 also including a tab 18E provided with a threaded hole 18F.

As seen in FIG. 3, the main support structure 20 typically is a rack or similar structure on which may also be supported the various processing elements of the massively parallel programmed computer that are to be interconnected optically by the optical interconnection network. The top surface of the rack advantageously includes rails 20A, 20B that define a groove 22 within which the tab portion 18B of the table 18 can be secured for providing vertical support and insuring proper alignment of the optical element mounted in support member 14. Tab portion 18E is provided with a hole 18F for a set screw (not shown) that can be used to secure the reference surface portions with surface portions of the rack.

Figure 4:
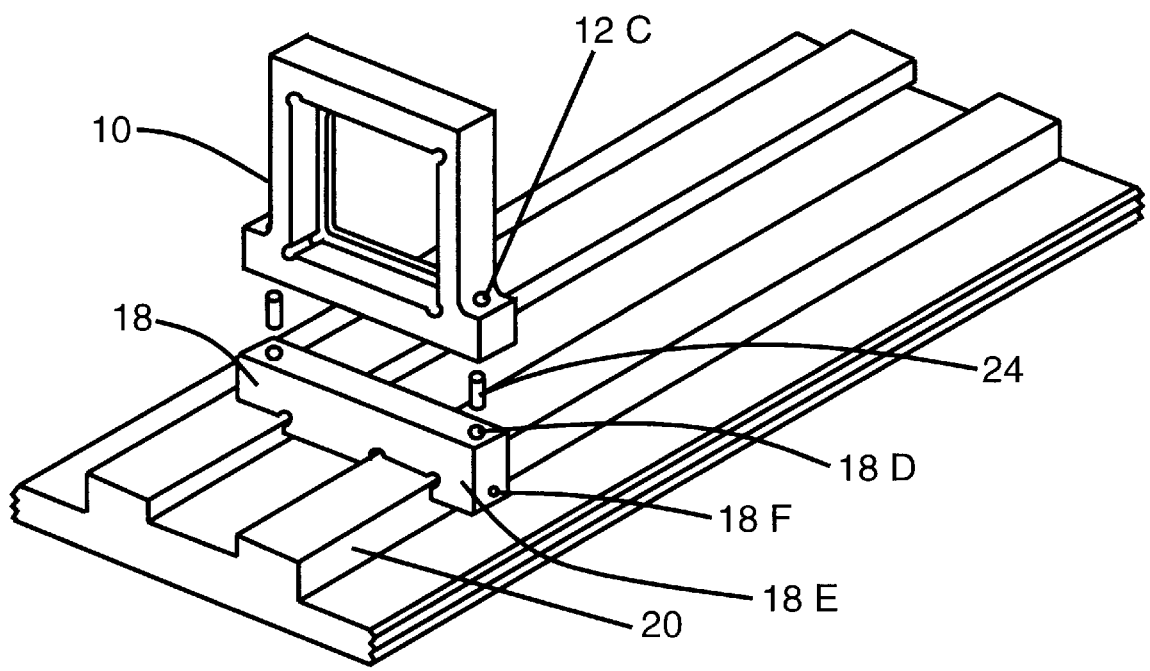
FIG. 4 is a three dimensional view of the assembly of the elements of FIGS. 1–3 to form a modular block in accordance with the invention.

FIG. 4 is a three dimensional view that shows the table 18 on the split rail rack 20 and the holder 10 on the table member 18 by means of the pins 24 extending through holes 18D in the base member and holes 12C in the bottom edge of frame 12 of the holder 10. A set screw in hole 18F in tab 18E is used to secure the reference surfaces 18C of the table 18 to align the optical element properly in the optical beam relay.

Figure 5A:
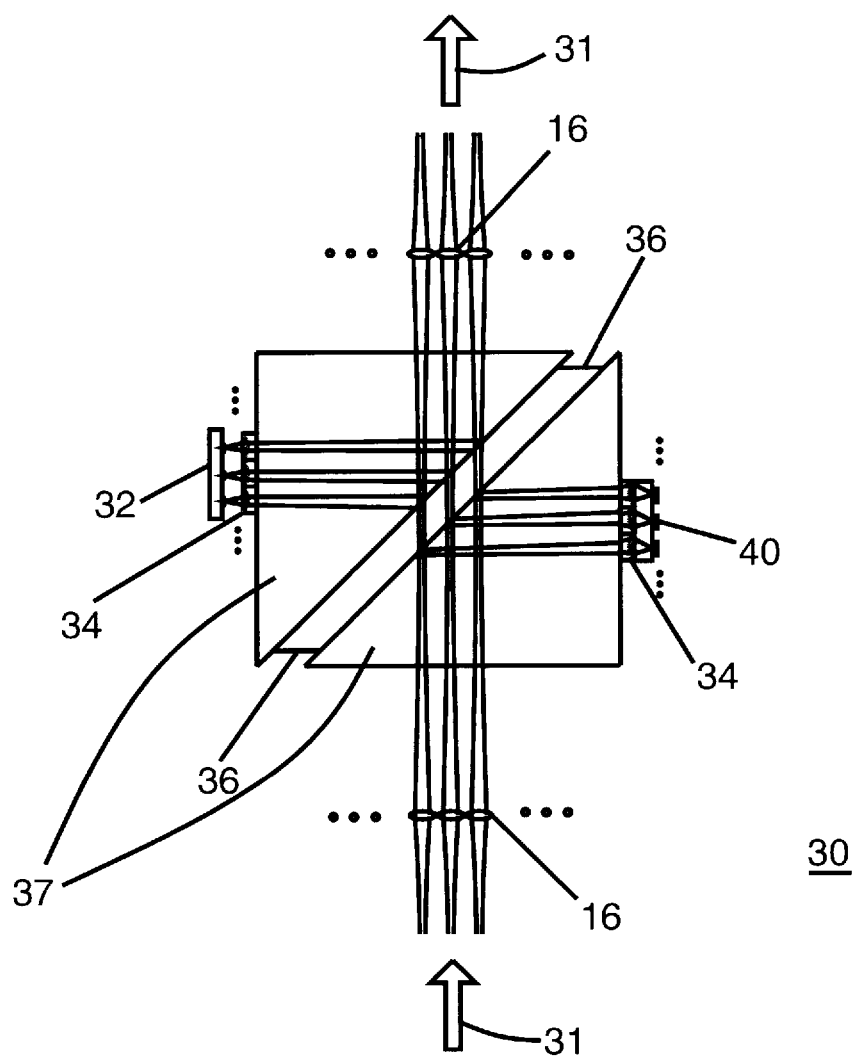
FIG. 5a shows a top view of a network utilizing transmitters and receivers and focusing elements supported in holders of the kind shown in FIG. 1.

FIG. 5a is a top view, looking down, on a relay repeater 30 of an optical beam relay system that forms an optical interconnection network of the kind for which the invention is of particular interest. The arrows 31 indicate the main flow of the optical channels.

The relay repeater 30 includes a VCSEL (vertical cavity surface emitting laser) array 32 that serves as a two-dimensional array of transmitting devices and a planar microlens array 34 that serves to collimate the various beams of the VCSELs. Each of arrays 32 and 34 are appropriately mounted on a holder. The collimated beams pass through the partial micromirror 36 inserted between prisms 37 and are redirected. Along the path of the redirected beams there typically would also be included planar microlens arrays 34 for maintaining the beams focused and these arrays might also be aligned and supported and in place by a holder of the kind described above. The main flow also extends through the microlens array 16.

Similarly an array of receivers 40 provided either by photodiodes or optical fibers would also be positioned along the paths of the optical beams to which selected beams might be directed by the partial micromirror.

Figure 5B:
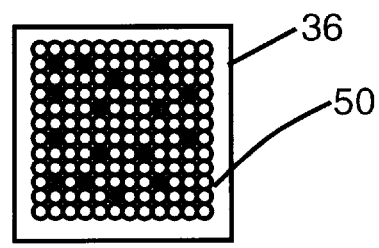
FIG. 5b is an expanded view of a possible light pattern at a partial micromirror used as a typical optical beam distribution within a relay repeater.

There is shown in FIG. 5b an expanded view 50 of a possible light pattern at a selected partial micromirror, the open circles representing a beam that is transmitted without redirection and the filled circles representing a beam that is redirected to a receiver according to a prescribed communication pattern.

Figure 6:
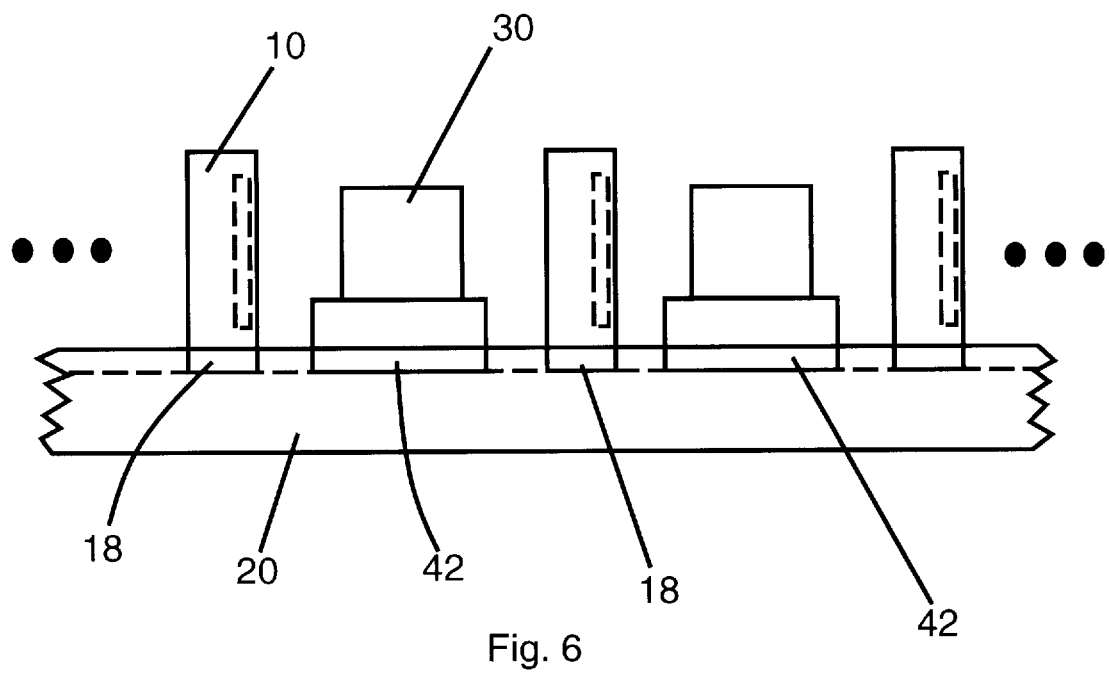
FIG. 6 is a side view of a portion of an optical interconnection network in which are used modular building blocks in accordance with the invention.

FIG. 6 is a sideview of a straight section of an optical interconnection network of the kind under discussion. A rack 20 is shown along which are spaced several microlens arrays in holders 10 for focusing the optical beams and relay repeaters 30 of the kind described.

Figure 7:
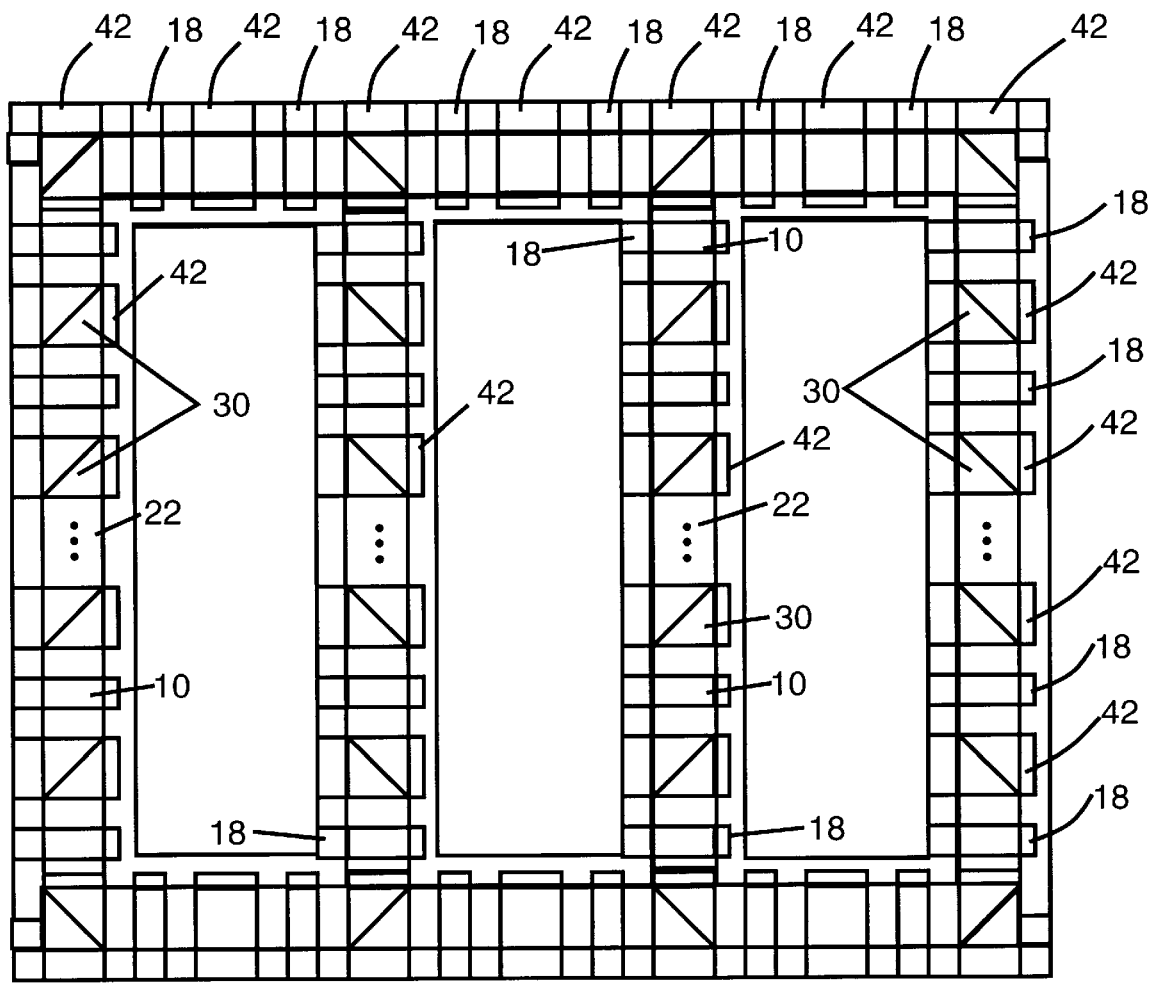
FIG. 7 is a schematic of a free space optical interconnection network using modular building blocks of the kind shown in FIGS. 1, 2, 3 and 5.

FIG. 7 is a top view of an interconnection network made up of sections of the kind shown in FIG. 6 and including microlens arrays in holders 10 and relay repeaters 30. The table 42 is similar to table 18 except that it is wider, as seen, to accommodate better the relay repeaters 30.

The prealigned and packaged optics used as the modular building blocks are positioned on an appropriately grooved rack to form an ICN of the kind mentioned earlier. The network would include transmitting modules, beam relaying modules, beam redirecting modules, and receiving modules.

Figure 8:
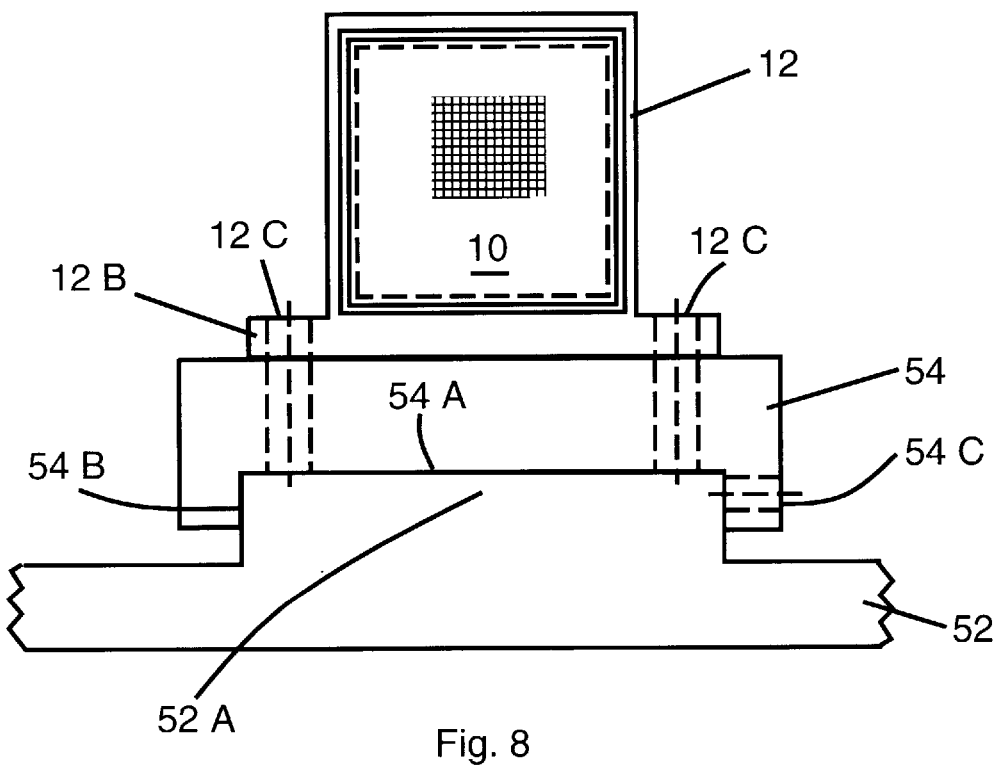
FIG. 8 is a cross section of an alternative embodiment of a building block module in accordance with the invention for use with a single rail rack.

In particular, it is feasible to employ different configurations of the table for use with different configurations of the rack in the arrangement that has been described above. In FIG. 8, there is shown an arrangement in which the rack 52 on which the table 54 is supported uses a single rail 52A that is inserted into a matching groove in the bottom surface 54A of the table 54. The holder portion 10 of the building block module can be of the same type as is used in the split rail arrangement described earlier. Additionally, as before, the table 54 provided with a pair of holes that match the holes 12C in the base 12B of the frame 12 of the holder. In this structure, the bottom surfaces 54A, 54B serve primarily as the reference surfaces for the alignment with 54C being a threaded hole for a set screw (not shown).

It is to be understood that the particular embodiments that have been described are merely illustrative of the principles of the invention and various modifications may be devised thereon without departing from the spirit and scope of the invention.

What is claimed is:

1. A modular building block for use in a free-space optical interconnection network comprising:

holding means for supporting an optical component for use in such network and including a support member on which said component is supported, a frame portion surrounding and holding in position said support member and a base portion by which said holding means is supported;

means for supporting said holding means in position comprising a table member having a top surface against which said base portion is held secured;

means for holding said base portion of said holding means rigidly to said smooth top surface of the means for supporting the holding means;

the back surface of said table member including a tab portion that is adapted to be inserted in a groove between a pair of rails in a rack that is to support the building block, the back surface including a pair of reference surface portions for alignment of the table member; and fastening means for securing the reference surfaces of the table member to the groove in the rack.

2. A modular building block for use in a free-space optical interconnection network in accordance with claim 1 in which said fastening means comprises a set screw tightened to a prescribed torque to achieve a desired alignment.

3. A modular building block in accordance with claim 1 in which the component being supported in the holding means is chosen from the group consisting of a microlens array, a microlaser array, fiber array and a microphotodiode array.

4. A free space optical interconnection network comprising a plurality of modular building blocks of the kind described in claim 1.

5. A modular building block in accordance with claim 1 further characterized in that the frame portion is rectangular and the component comprises a two-dimensional rectangular array.

6. A modular building block for use in a free-space optical interconnection network comprising:

holding means for supporting an optical component for use in such network and including a support member on which said component is supported, a frame portion surrounding and holding in position said support member and a base portion by which said holding means is supported;

means for supporting said holding means in position comprising a table member having a top surface against which said base portion is secured;

means for holding said base portion of said holding means secured to said smooth top surface of the means for supporting the holding means;

the back surface of said table member including a groove adapted to be fitted in a rail on a rack that is to support the building block, the back surface including a pair of reference surface portions for alignment of the table member; and fastening means for maintaining the reference surfaces of the table member in firm contact in the groove in the rack.

7. A modular building block in accordance with claim 6 further characterized that said fastening means passes through the base portion of the holding means and the table and press fitting the reference surfaces to the top surface of the rack.

\* \* \* \* \*